US012612539B2

(12) United States Patent (10) Patent No.: US 12,612,539 B2
Deegan et al. (45) Date of Patent: Apr. 28, 2026

(54) RADIATION CURABLE (METH)ACRYLIC ADHESIVE COMPOSITION

(71) Applicant: Henkel AG & Co. KGaA, Duesseldorf (DE)

(72) Inventors: Brian Deegan, Blessington (IE); David Branagan, Dublin (IE); Nigel Sweeney, Dublin (IE); Yongxia Wang, Bridgewater, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 137 days.

(21) Appl. No.: 18/471,360

(22) Filed: Sep. 21, 2023

(65) Prior Publication Data

US 2024/0018399 A1 Jan. 18, 2024

Related U.S. Application Data

(63) Continuation of application No. PCT/CN2021/085264, filed on Apr. 2, 2021.

(51) Int. Cl.
C09J 133/10 (2006.01)

(52) U.S. Cl.
CPC ....... C09J 133/10 (2013.01); C09J 2301/312 (2020.08); C09J 2301/408 (2020.08); C09J 2301/416 (2020.08)

(58) Field of Classification Search
None
See application file for complete search history.

(56) References Cited

U.S. PATENT DOCUMENTS

| | | | |
|---|---|---|---|
| 6,433,091 | B1 | 8/2002 | Cheng |
| 6,596,787 | B1 | 7/2003 | Demarco et al. |
| 8,883,315 | B2 | 11/2014 | Lee et al. |

| | | | |
|---|---|---|---|
| 9,663,685 | B2 | 5/2017 | Wang et al. |
| 2006/0258829 | A1 | 11/2006 | Wang et al. |
| 2007/0037911 | A1* | 2/2007 | Sugi ...................... C08F 279/02 |
| | | | 524/571 |
| 2009/0030107 | A1 | 1/2009 | Watanabe et al. |
| 2016/0024357 | A1 | 1/2016 | Zhang et al. |
| 2017/0174956 | A1 | 6/2017 | Ramon-Gimenez et al. |
| 2020/0079949 | A1 | 3/2020 | Haberlin et al. |

FOREIGN PATENT DOCUMENTS

| | | | | |
|---|---|---|---|---|
| CN | 101184783 | A | 5/2008 | |
| CN | 102898959 | A | 1/2013 | |
| CN | 105062375 | A | 11/2015 | |
| CN | 106928870 | A | 7/2017 | |
| CN | 107936906 | A | 4/2018 | |
| CN | 109294460 | A | 2/2019 | |
| JP | 2009167346 | A | 7/2009 | |
| JP | 2013234208 | A | 11/2013 | |
| JP | 2017122213 | A | 7/2017 | |
| WO | WO-9823658 | A1 * | 6/1998 | ............... C09J 4/06 |
| WO | 2006129678 | A1 | 12/2006 | |
| WO | 2020229948 | A1 | 11/2020 | |

OTHER PUBLICATIONS

Nisso PB TE series (Year: 2014).*

* cited by examiner

*Primary Examiner* — Robert S Jones, Jr.

*Assistant Examiner* — Lily K Sloan

(74) *Attorney, Agent, or Firm* — Steven C. Bauman

(57) ABSTRACT

The present invention relates to a radiation curable (meth) acrylic adhesive composition comprising, consisting essentially of: i) a (meth)acrylated polydiene resin; ii) a multifunctional (meth)acrylic monomer component; iii) a monofunctional (meth)acrylic monomer component; and iv) a photo initiator component.

13 Claims, 2 Drawing Sheets

RADIATION CURABLE (METH)ACRYLIC ADHESIVE COMPOSITION

TECHNICAL FIELD

The present invention relates to a radiation curable (meth) acrylic adhesive composition, which upon cured, having both good chemical resistance at elevated temperature and good mechanical properties.

BACKGROUND OF THE INVENTION

Adhesive compositions are widely used in many applications, and in some applications, there is a need for the adhesives to be tough in case of impact, such as when the bonded devices are dropped, and to be chemically resistant when the bond line is exposed to chemical attack, such as ethanol in hand sanitizer solutions or oil-containing compositions (such as those present on the skin of an individual).

It has been developed some radiation curable adhesives having good chemical resistance, such as radiation curable epoxy adhesives; however, such radiation curable epoxy adhesives are brittle and have significantly insufficient elongation.

There also are some radiation curable (meth)acrylic adhesives that are tough and strong in case of impact; however, they typically are less chemically resistant, especially at elevated temperature.

Regarding the mechanical properties, as shown in FIG. 1, the larger the area under the curve, the higher the toughness of a material. So, it is difficult to obtain a material with a high Young's modulus, a high tensile strength and a high elongation at the same time. For example, a material with high modulus and tensile strength but with low elongation (e.g., comparative example of the present invention) is not tough, as it does not have a large area under the curve.

There is a need to develop a radiation curable adhesive having both good chemical resistance at elevated temperature and good mechanical properties including tensile strength, elongation and Young's modulus.

SUMMARY OF THE INVENTION

After intensive study, the inventors found that a radiation curable (meth)acrylic adhesive having both good chemical resistance at elevated temperature and good mechanical properties including tensile strength, elongation and Young's modulus can be achieved when a (meth)acrylated polydiene resin is used together with multi- and mono-functional (meth)acrylic monomers in the adhesive composition.

In one aspect, the present invention provides a radiation curable (meth)acrylic adhesive composition, comprising or consisting essentially of:

i) a (meth)acrylated polydiene resin;
    ii) a multi-functional (meth)acrylic monomer component;
    iii) a mono-functional (meth)acrylic monomer component; and
    iv) a photo initiator component.

In another aspect, the present invention provides a method of bonding substrates together using the radiation curable (meth)acrylic adhesive composition of the present invention.

In another aspect, the present invention provides an article bonded with the cured product of the radiation curable (meth)acrylic adhesive composition of the present invention.

DETAILED DESCRIPTION OF THE INVENTION

Figure 1:
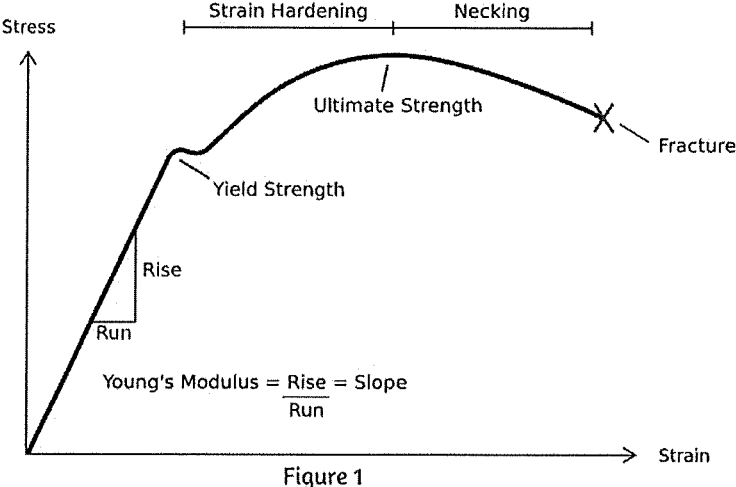
FIG. 1 depicts an illustrative curve showing stress versus strain.

It is to be understood by one of ordinary skill in the art that the present discussion is a description of exemplary embodiments only and is not intended as limiting the broader aspects of the present invention. Each aspect so described may be combined with any other aspect(s) unless clearly indicated to the contrary. In particular, any feature indicated as being preferred or advantageous may be combined with any other feature or features indicated as being preferred or advantageous.

Unless specified otherwise, in the context of the present invention, the terms used are to be construed in accordance with the following definitions.

Unless specified otherwise, all wt. % or % by weight values quoted herein are percentages by weight.

Unless specified otherwise, as used herein, the terms "a", "an" and "the" include both singular and plural referents.

The terms "comprising" and "comprises" as used herein are synonymous with "including", "includes" or "containing", "contains", and are inclusive or open-ended and do not exclude additional, non-recited members, elements or process steps.

The term "consisting essentially of" as used herein means that the listed components constitute main body of the composition, for example, at least 80% by weight of the composition, at least 85% by weight of the composition, or at least 90% by weight of the composition.

The term "consisting of" as used herein is close-ended and exclude additional, non-recited members, elements or process steps.

The term "(meth)acrylic" used herein intends to mean both "acrylic" and "methacrylic", indicating compound(s) carrying one or more (meth)acryloyl groups.

The term "(meth)acrylate" used herein intends to mean both "acrylate" and "methacrylate", indicating compound(s) carrying one or more (meth)acryloyloxy groups.

The term "at least one" or "one or more" used herein to define a component refers to the type of the component, and not to the absolute number of molecules. For example, "one or more monomers" means one type of monomer or a mixture of a plurality of different monomers.

The terms "about", "around" and the like used herein in connection with a numerical value refer to the numerical value±10%, preferably ±5%. All numerical values herein should be interpreted as being modified by the term "about".

Unless specified otherwise, the recitation of numerical end points includes all numbers and fractions subsumed within the respective ranges, as well as the recited end points.

All references cited in the present specification are hereby incorporated by reference in their entirety.

Unless otherwise defined, all terms used in the present invention, including technical and scientific terms, have the meaning as commonly understood by one of the ordinary skilled in the art to which this invention belongs.

Hereinafter the radiation curable (meth)acrylic adhesive composition will be described in detail.

The radiation curable (meth)acrylic adhesive composition of the present invention comprises or consists essentially of:

i) a (meth)acrylated polydiene resin;

ii) a multi-functional (meth)acrylic monomer component;

iii) a mono-functional (meth)acrylic monomer component; and iv) a photo-initiator component.

Component i)

As the first essential component, one or more (meth) acrylated polydiene resins can be contained in the adhesive composition of the present invention. The (meth)acrylated polydiene resin used herein intends to mean the resin(s) having polydiene as the backbone and having one or more (meth)acryloyloxy groups grafted thereon.

As for the polydiene backbone, preferred is a poly($C_4$-$C_8$)diene, for example, polybutadiene, polypentadiene, polyisoprene, polyhexadiene, polyheptadiene, polyoctadiene and their isomers. More preferably, the polydiene backbone is not derived from the cumulated diene(s). More preferably, the polydiene backbone is derived from the diene(s) having the double bonds at the ends. Moreover, the polydiene backbone can be derived from one or more dienes. Preferably, the polydiene backbone is derived from one type of dienes, more preferably, from polybutadiene.

The (meth)acrylated polydiene resin used herein can be selected from a (meth)acrylated polybutadiene resin, a (meth)acrylated polypentadiene resin, a (meth)acrylated polyisoprene resin, a (meth)acrylated polyhexadiene resin, a (meth)acrylated polyheptadiene resin, a (meth)acrylated polyoctadiene resin, and mixtures thereof. In a preferred embodiment, the (meth)acrylated polydiene resin used herein is the (meth)acrylated polybutadiene resin.

As for the linkage between the polydiene backbone and the (meth)acryloyloxy group(s), it is not particularly limited. In a preferred embodiment, the linkage is a urethane linkage, that is, the (meth)acryloyloxy group(s) is/are grated on the polydiene backbone through urethane linkage(s).

In a preferred embodiment, the (meth)acrylated polydiene resins useful in the present invention are those resins having at least two (meth)acryloyloxy groups, for examples, two to four (meth)acryloyloxy groups, grated on the polydiene backbone. In a more preferred embodiment, the (meth) acrylated polydiene resins useful in the present invention are those resins having two (meth)acryloyloxy groups grated on polydiene the backbone. For example, the two (meth)acryloyloxy groups can be grated on two ends of the polydiene backbone, respectively.

In a more preferred embodiment, the (meth)acrylated polydiene resins useful in the present invention are (meth) acrylated polybutadiene resins having two (meth)acryloyloxy groups grated on the polybutadiene backbone via urethane groups. For example, the two (meth)acryloyloxy groups can be grafted on two ends of the polybutadiene backbone, respectively.

In a preferred embodiment, the (meth)acrylated polydiene resins useful in the present invention have a viscosity of less than 24,000 cP at 60° C., preferably of from 10,000 to 23,000 cP at 60° C. The viscosity values herein can be determined with any suitable viscosity measurement method conventionally used in the art.

Commercially available products of the (meth)acrylated polydiene resins that can be used in the present invention include, for example, Bomar 641D from Dymax, which is a di-functional acylated polybutadiene having two acryloyloxy groups grated on polybutadiene backbone via urethane groups.

In a preferred embodiment, the adhesive composition does not contain (meth)acrylated polyether resin(s) and/or (meth)acrylated urethane resin(s). In other words, the adhesive composition does not contain resin(s) having polyether and/or polyurethane as the backbone and having the (meth) acryloyloxy group(s) grafted thereon.

In the present invention, the (meth)acrylated polydiene resin can be contained in the adhesive composition in an amount of from 10 to 65% by weight, preferably from 30 to 55% by weight, more preferably from 40 to 50% by weight, based on the total weight of the adhesive composition.

Component ii)

As the second essential component, one or more multifunctional (meth)acrylic monomers can be contained in the adhesive composition of the present invention.

The multi-functional (meth)acrylic monomer intends to mean a monomer carrying more than one (meth)acryloyl group, for example, carrying two to six (meth)acryloyl groups. That is, the multi-functional (meth)acrylic monomer used herein preferably can be di- to hexa-functional (meth) acrylic monomer.

Adding the multi-functional (meth)acrylic monomer component into the (meth)acrylic adhesive composition is conventionally believed to increase the degree of crosslinking, which on one hand can contribute the chemical resistance to the adhesive, and on the other hand lead to brittleness of the adhesive. However, in the present invention, it is surprisingly found that combining the (meth)acrylated polydiene resin with multi-functional (meth)acrylic monomer(s) can achieve both good chemical resistance at elevated temperature and good mechanical properties including Young's Modulus, elongation and tensile strength.

In the present invention, types of the multi-functional (meth)acrylic monomers are not particularly limited and the conventionally used multi-functional (meth)acrylic monomers can be used in the adhesive composition.

Examples of the multi-functional (meth)acrylic monomer include but are not limited to: di-functional (meth)acrylic monomers such as 1,3-butanediol di(meth)acrylate, 1,4-butanediol di(meth)acrylate, 1,6-hexanediol di(meth)acrylate, 2-butyl-2-ethyl-1,3-propanediol di(meth)-acrylate, 1,9-nonanediol di(meth)acrylate, ethylene glycol di(meth) acrylate, bisphenol A-ethylene glycol di(meth)acrylate, diethylene glycol di(meth)acrylate, triethylene glycol di(meth)-acrylate, tetraethylene glycol di(meth)acrylate, propylene glycol di(meth)acrylate, dipropylene glycol di(meth)acrylate, tripropylene glycol di(meth)acrylate, neopentyl glycol di(meth)acrylate, dicyclopentanyl di(meth) acrylate, caprolactone-modified dicyclopentenyl di(meth) acrylate, di(acryloxyethyl)isocyanurate, allylated cyclohexyl di(meth)acrylate, dimethylol dicyclopentane di(meth)acrylate, neopentylglycol-modified trimethylolpropane di(meth)acrylate, adamantine di(meth)acrylate, tricyclodecanedimethanol di(meth)acrylate, etc.; tri-functional monomers such as trimethylolpropane tri(meth)acrylate, pentaerythritol tri(meth)acrylate, dipentaerythritol tri(meth) acrylate, propylene oxide-modified trimethylolpropane tri (meth)acrylate, tris(acryloxy-ethyl)isocyanurate, etc.; 4-functional monomers such as pentaerythritol tetra(meth) acrylate, ditrimethylolpropane tetra(meth)acrylate, tetramethylolpropane tetra(meth)acrylate, etc.; 5-functional monomers such as dipentaerythritol penta(meth)acrylate; 6-functional monomers such as dipentaerythritol hexa(meth) acrylate, or the like.

The multi-functional (meth)acrylic monomer component can be contained in the adhesive composition in an amount of from 0.1 to 25% by weight, preferably from 5 to 15% by weight, based on the total weight of the adhesive composition. When the content of the multi-functional (meth)acrylic monomer component is less than 0.1 wt. %, the desired chemical resistance may not be achieved, and when the content of the multi-functional (meth)acrylic monomer component is more than 25 wt. %, the desired mechanical property such as elongation may not be achieved.

Component iii)

As the third essential component, one or more mono-functional (meth)acrylic monomers can be contained in the adhesive composition of the present invention.

In the present invention, the mono-functional (meth) acrylic monomer is used as a diluting monomer having a functional group cross-linkable with the (meth)acrylated polydiene resin while simultaneously controlling the viscosity of the adhesive composition.

In the present invention, types of the mono-functional (meth)acrylic monomers are not particularly limited and the conventionally used mono-functional (meth)acrylic monomers can be used the adhesive composition. Examples thereof may particularly include a mono-functional (meth) acrylic monomer having no hydroxyl group, a mono-functional (meth)acrylic monomer having a hydroxyl group, or mixtures thereof.

Examples of the mono-functional (meth)acrylic monomer having no hydroxyl group may include but are not limited to: acrylic acid, n-butyl (meth)acrylate, 2-butyl (meth)acrylate, t-butyl (meth)acrylate, isobutyl (meth)acrylate, hexyl (meth) acrylate, 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, 2-methylbutyl (meth)acrylate, n-nonyl (meth)acrylate, isononyl (meth)acrylate, isoamyl (meth)acrylate, n-decyl (meth)acrylate, isodecyl (meth) acrylate, isobornyl (meth)acrylate, 4-methyl-2-pentyl (meth)acrylate, dodecyl (meth)acrylate, lauryl (meth)acrylate, 2-ethoxyethyl (meth)acrylate, 2-methoxyethyl (meth) acrylate and allyl (meth)acrylate.

Examples of the mono-functional (meth)acrylic monomer having hydroxyl group(s) may include but are not limited to: 2-hydroxyethyl (meth)acrylate, 2-hydroxypropyl (meth) acrylate, 2-hydroxybutyl (meth)acrylate, 4-hydroxybutyl (meth)acrylate, 6-hydroxyhexyl (meth)acrylate, and hydroxyalkylene (having 2 to 4 carbon atoms) glycol (meth) acrylate such as 2-hydroxyethyleneglycol (meth)acrylate and 2-hydroxypropyleneglycol (meth)acrylate.

The amount of the mono-functional (meth)acrylic monomer component may be adjusted according to practical requirement for the viscosity of the adhesive. In a preferred embodiment, the mono-functional (meth)acrylic monomer component can be contained in the adhesive composition in an amount of from 1 to 40% by weight, preferably from 7 to 39% by weight, more preferably, from 15 to 38% by weight, based on the total weight of the adhesive composition.

Component iv)

A photo-initiator is a component to sufficiently cure the adhesive composition and types or species thereof are not particularly limited. The commonly known photo-initiators can be used in the present invention.

Examples of the photo-initiator include but are not limited to: benzoin, benzoin methylether, benzoin ethylether, benzoin isopropylether, benzoin-n-butylether, benzoin isobutylether, acetophenone, hydroxydimethyl acetophenone, dimethylamino acetophenone, dimethoxy-2-phenyl acetophenone, 3-methyl acetophenone, 2,2-dimethoxy-2-phenyl acetophenone, 2,2-diethoxy-2-phenyl acetophenone, 4-chloroacetophenone, 4,4-dimethoxyacetophenone, 2-hydroxy-2-methyl-1-phenylpropane-1-one, 4-hydroxy cyclophenylketone, 2-methyl-1-[4-(methylthio)phenyl]-2-morpholino-propane-1-one, 4-(2-hydroxyethoxy)phenyl-2-(hydroxyl-2-propyl)ketone, benzophenone, p-phenylbenzophenone, 4,4-diaminobenzophenone, 4,4'-diethylaminobenzophenone, dichlorobenzophenone, anthraquinone, 2-methylanthraquinone, 2-ethylanthraquinone, 2-t-butylanthraquinone, 2-aminoanthraquinone, β-chloroanthraquinone, 2-methylthioxantone, 2-ethylthioxantone, 2-chlorothioxantone, 2,4-dimethylthioxantone, 2,4-diethylthioxantone, benzyl dimethylketal, diphenylketone benzyldimethylketal, acetophenone dimethylketal, p-dimethylaminobenzoic ester, 2,4,6-trimethylbenzoyl diphenylphosphine oxide, fluorene, triphenylamine, carbazole, benzyldiphenyl sulfide, tetramethylthiuram monosulfide, or ethyl(2,4,6-trimethylbenzoyl) phenylphosphinate, 1-hydroxycyclohexylphenylketone, oxy-phenyl-acetic acid 2-[2-oxo-2-phenyl-acetoxy-ethoxy]-ethyl ester, oxy-phenyl-acetic acid 2-[2-hydroxy-ethoxy]-ethyl ester, 2-hydroxy-2-methyl-1-phenyl-1-propanone, phosphine oxide phenyl bis (2,4,6-trimethyl benzoyl), iodonium (4-methylphenyl)[4-(2-methylpropyl)phenyl]-hexafluorophosphate(1-), and the like. The foregoing photo-initiators may be used alone or in combination.

In the present invention, the photo-initiator component can be contained in the adhesive composition in an amount of from 0.1 to 10% by weight, preferably from 0.3 to 5% by weight, more preferably, from 0.5 to 4.5% by weight, based on the total weight of the adhesive composition. In the case where content of the photo-initiator is less than 0.1 wt. %, the curing speed may become too slow. On the other hand, when the content of the photo-initiator is more than 10 wt. %, yellowing may be caused and/or durability may be reduced.

Other Components

In addition to the above components i) to iv), the adhesive composition of the present invention may optionally comprise other additives that are conventionally used in the art, for example, an organosilane, an antioxidant, a corrosion-resistant agent, a leveling agent, a surface lubricant, a dye, a pigment, a defoaming agent, a filler, a photo-stabilizer, and so forth.

An organosilane can be optionally contained in the adhesive composition of the present invention so as to improve bonding force. Examples of the organosilane include but are not limited to: vinyl chlorosilane, vinyl trimethoxysilane, vinyl triethoxysilane, 2-(3,4-epoxy cyclohexyl)ethyl trimethoxysilane, 3-glycidoxypropyl trimethoxysilane, 3-glycidoxypropyl methyldiethoxysilane, 3-glycidoxypropyl diethoxysilane, 3-glycidoxypropyl triethoxysilane, p-styryl trimethoxysilane, 3-methacryloxypropyl triethoxysilane, 3-methacryloxypropyl trimethoxysilane, 3-methacryloxypropylmethyl dimethoxysilane, 3-methacryloxypropylmethyl diethoxysilane, 3-acryloxypropyl trimethoxysilane, N-2-(aminoethyl)-3-aminopropylmethyl dimethoxysilane, N-2-(aminoethyl)-3-aminopropyl trimethoxysilane, N-2-(aminoethyl)-3-aminopropylmethyl triethoxysilane, 3-aminopropyl trimethoxysilane, 3-aminopropyl triethoxysilane, 3-triethoxysilyl-N-(1,3-dimethylbutylidene)propylamine, N-phenyl-3-aminopropyl trimethoxysilane, 3-chloropropyl trimethoxysilane, 3-mercaptopropylmethyl dimethoxysilane, 3-mercaptopropyl trimethoxysilane, bis(triethoxysilylpropyl)tetrasulfide, 3-isocyanatepropyl triethoxysilane, or the like, which may be used alone or in any combinations.

In a preferred embodiment, the organosilane may be comprised in an amount of from 0 to 10% by weight, for example, 0.005 to 5% by weight, based on the total weigh of the adhesive composition. In the case where content of the coupling agent is more than 10 wt. %, durability may be reduced.

Examples of useful antioxidants include hindered phenolic antioxidants, phosphite antioxidants, thioether antioxidants.

The fillers can be in a variety of forms including, e.g., particles (spherical particles, beads, and elongated particles), fibers, and combinations thereof. Examples of the fillers include but are not limited to: talcs, clays, silicas and treated versions thereof, carbon blacks and micas, and the like.

Examples of useful pigments include inorganic, organic, reactive, and nonreactive pigments, and combinations thereof.

The (meth)acrylic adhesive composition of the present invention can be cured by exposure to actinic radiation, for example, an LED source, e-beams, mercury arc source, UV light, visible light, and the like.

In a preferred embodiment, the (meth)acrylic adhesive composition of the present invention does not comprise the isocyano-containing compound(s).

Method for Bonding Substrates

The present invention provides a method of bonding substrates together using the radiation curable (meth)acrylic adhesive composition of the present invention. The method includes applying the adhesive composition of the present invention to at least one of the substrates, and then mating the substrates together, and then exposing to the actinic radiation until the adhesive composition is cured. In one embodiment, at least one substrate can comprise a light transparent part, or at least one substrate is light transparent. In a further embodiment, at least one substrate can comprise a plastics material or a glass material that is transparent to UV or visible light.

The adhesive composition can be applied to a substrate using any suitable application method including, e.g., automatic fine line dispensing, jet dispensing, slot die coating, roll coating, pattern coating, screen printing, spray coating, filament coating, air knife, trailing blade, brushing, dipping, doctor blade, and combinations thereof. The adhesive composition can be applied as a continuous or discontinuous coating, in a single layer or multiple layers, and combinations thereof.

Bonded Articles

The present invention provides an article bonded with the cured product of the radiation curable (meth)acrylic adhesive composition of the present invention.

The adhesive composition of the present invention is useful in a variety of electronic devices including, e.g., wearable electronic devices (e.g., wrist watches and eyeglasses), handheld electronic devices (e.g., phones (e.g., cellular telephones and cellular smartphones), cameras, tablets, electronic readers, monitors (e.g., monitors used in hospitals, and by healthcare workers, athletes and individuals), watches, calculators, mice, touch pads, and joy sticks), computers (e.g., desk top and lap top computers), computer monitors, televisions, media players, appliances (e.g., refrigerators, washing machines, dryers, ovens, and microwaves), light bulbs (e.g., incandescent, light emitting diode, and fluorescent), and articles that include a visible transparent or transparent component, glass housing structures, protective transparent coverings for a display or other optical component.

EXAMPLES

The invention will now be described by way of the following examples. The following examples are intended to assist one skilled in the art to better understand and practice the present invention. The scope of the invention is not limited by the examples but is defined in the appended claims. All parts and percentages are based on weight unless otherwise stated.

Radiation Curable (Meth)Acrylic Adhesive Compositions (EX. 1 to 3 and CE 1)

The adhesive compositions were prepared by mixing each component listed in Table 1.

Chemical Resistance Test

Bonds were made with 3 mm×25 mm overlap on soda glass using 125 μm spacer beads. They were all cured under 375 nm LED at 100 mW/cm² for 20 seconds followed by 90 minutes at 160° C.

20 bonds were made with each composition, wherein five were tested for initial lap shear strength, five each were placed in isopropanol(IPA):water solution, ethanol:water solution, and oleic acid respectively for 72 hours at 65° C.

Lap shear strengths were tested using a tensile testing machine under a pulling speed of 10 mm/min. The average recorded strengths are reported in Table 1.

Mechanical Properties Test

Figure 2:
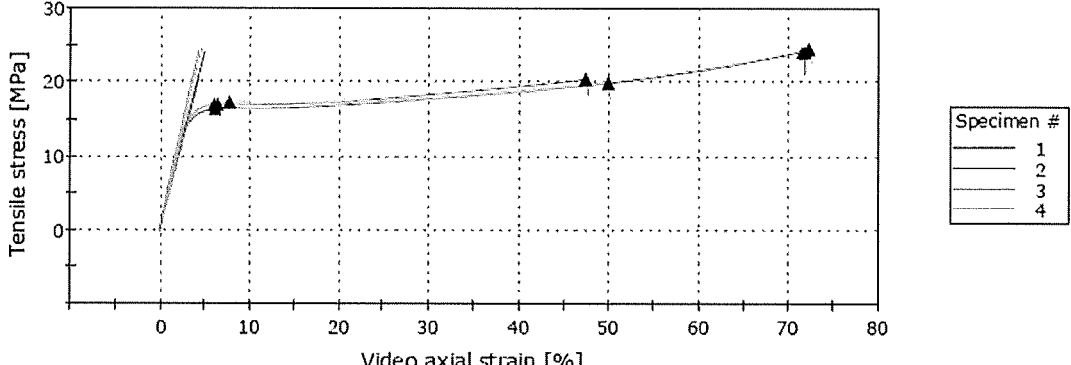
FIG. 2 is a graph showing tensile stress (measured in MPa) versus video axial strain (measured in percentage) of Examples 1-3.
Figure 3:
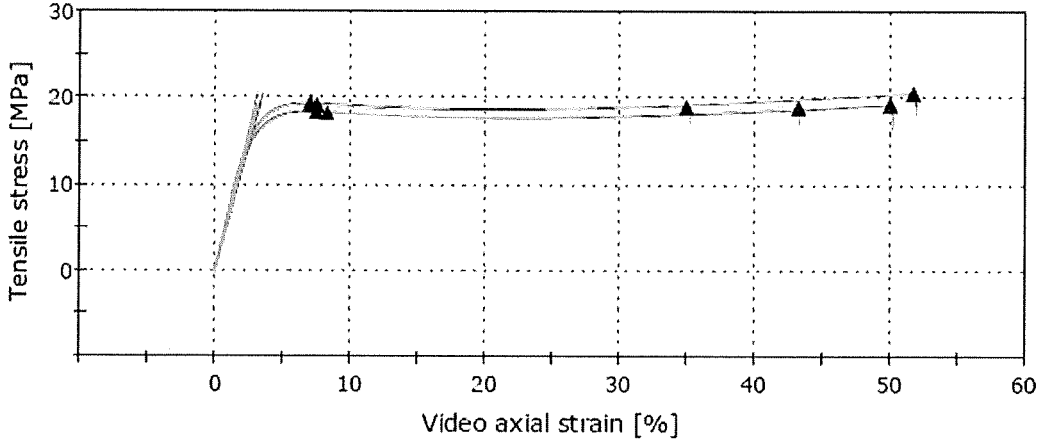
FIG. 3 is a graph showing tensile stress (measured in MPa) versus video axial strain (measured in percentage) of Examples 1-3.
Figure 4:
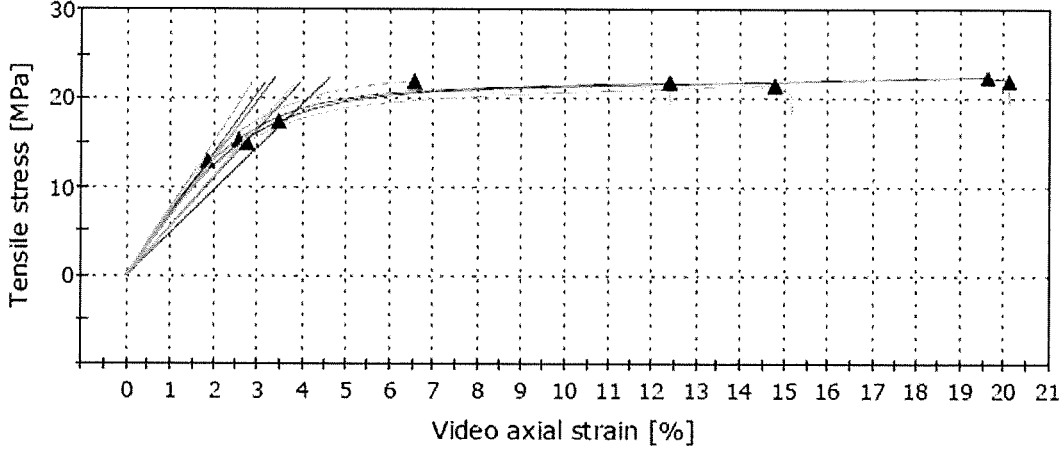
FIG. 4 is a graph showing tensile stress (measured in MPa) versus video axial strain (measured in percentage) of Examples 1-3.

Mechanical properties were tested using an ASTM D638 Type IV dog bone with a thickness of 1 mm cured by the same method as the bonds stated above for chemical resistance test, and the tensile strengths, the elongations and Young's Moduli were measured using a pulling speed of 100 mm/min. The average values are reported in Table 1. The resulted graphs of EX. 1 to 3 are shown in FIGS. 2 to 4, respectively.

TABLE 1

| Component (wt. %) | Ex1 | EX2 | EX3 | CE1 |
| --- | --- | --- | --- | --- |
| Methacyrlated Polybutadiene resin urethane dimethacrylate (sartomer CN1964*) | 47.77 | 43.75 | 48 | |
| Methacrylated polytetrahydrofuran resin | | | | 57.55 |
| Isobornyl Methacrylate | 35.25 | 26.6 | 31.35 | 2.62 |
| Isobornyl Acrylate | | 15 | | 16.78 |
| HydroxyEthyl Methacrylate | | | 2 | 4 |
| 2% Ethane-1,2-diol Tetrasodium ethylenediaminetetraacetate in glycol:water mix (stabilizer) | 0.2 | 0.2 | 0.2 | 0.2 |
| dipentaerythritol pentaacrylate | 1.98 | | | |

TABLE 1-continued

| Component (wt. %) | Ex1 | EX2 | EX3 | CE1 |
|---|---|---|---|---|
| Acrylic acid | 0.99 | 0.5 | 0.5 | 4.9 |
| 3-(glycidooxypropyl)trimethoxy-silane | 0.94 | 0.95 | 0.95 | 0.95 |
| 1-hydroxycyclohexyl phenyl ketone | 1.98 | 2 | 2 | 2 |
| ethyl (2,4,6-trimethylbenzoyl) phenylphosphinate | 0.99 | 1 | 1 | 1 |
| 50% disperced silica in Tricyclo-decanedimethanol diacrylate | | | | 2 |
| tricyclodecanedimethanol dimethacrylate | 9.9 | 10 | 14 | 8 |
| mercapto modified polyester acrylate resin (Ebecryl LED02#) | | | | |
| Total % | 100 | 100 | 100 | 100 |
| Performance Chemical resistance | | | | |
| Curing process: LED 20s + 160° C. for 90 min | | | | |
| Average Initials strength (MPa) | 24.8 | 23.5 | 19.6 | 10.2 |
| Average Post strength (MPa) IPA:Water for 72 hours at 65° C. | 26.2 | 23.6 | 22.9 | 7.2 |
| Average Post strength (MPa) Ethanol:Water for 72 hours at 65° C. | 19.4 | 25.5 | 22.3 | 6.5 |
| Average Post strength (MPa) Oleic Acid for 72 hours at 65° C. | 27.1 | 24.9 | 22.3 | 18.5 |
| Mechanical properties | | | | |
| Curing process: LED 20s + 160° C. for 90 min | | | | |
| Average Tensile Strength (MPa) | 22.4 | 19.4 (break strength) | 21.8 | 47.6 |
| Average Elongation (%) | 60.3 | 45 | 17.1 | 2.3 |
| Average Young's Modulus (MPa) | 562.9 | 628.4 | 620.4 | 2352.3 |

*Sartomer CN1964, commercially available from Sartomer.

Ebecryl LED02, commercially available from Allnex GmbH, is a mercapto modified polyester acrylate resin.

It can be seen from Table 1 that the adhesive compositions according to the present invention achieved both good chemical resistance at elevated temperature and good mechanical properties including tensile strength and elongation and Young's modulus, while the adhesive composition of comparative example 1 (CE1), which contains urethane dimethacrylate instead of the methacrylated polybutadiene resin, exhibited extremely low elongation, indicating the brittleness of the cured product.

Comparative Example 2 (CE2)

The adhesive composition of CE2 was prepared by mixing each component listed in Table 2.

Bonds were made with 3 mm×25 mm overlap on soda glass using 125 μm spacer beads. They were all cured under 375 nm LED at 100 mW/cm² for 20 seconds followed by 90 minutes at 160° C.

35 bonds were made with the composition, wherein five were tested for initial lap shear strength, five each were placed in IPA:water solution, ethanol:water solution, and oleic acid respectively for 72 hours at room temperature (RT), and five each were placed in IPA:water solution, ethanol:water solution, and oleic acid respectively for 90 hours at 65° C. Lap shear strengths were tested using a tensile testing machine under a pulling speed of 10 mm/min. The average recorded strengths are reported in Table 2.

Mechanical properties were tested according to ASTM D882-09 using a film thickness of 500 μm and width of 6 mm. The films were cured by the same method as the bonds stated above, and the tensile strengths, the elongations and Young's Moduli were measured using a pulling speed of 10 mm/min. The average values are reported in Table 2.

TABLE 2

| Component (wt. %) | CE2 |
|---|---|
| Methacrylated polytetrahydrofuran resin | 49.78 |
| Isobornyl Methacrylate | 2.62 |
| Isobornyl Acrylate | 24.775 |
| HydroxyEthyl Methacrylate | 11.775 |
| 2% Ethane-1,2-diol Tetrasodium ethylenediaminetetraacetate in glycol:water mix (stabilizer) | 0.2 |
| Acrylic acid | 4.9 |
| 3-(glycidooxypropyl)trimethoxy-silane | 0.95 |
| 1-hydroxycyclohexyl phenyl ketone | 2 |
| ethyl (2,4,6-trimethylbenzoyl) phenylphosphinate | 1 |
| mercapto modified polyester acrylate resin (Ebecryl LED02) | 2 |
| Total % | 100 |
| Performance Chemical resistance | |
| Curing process: LED 20s + 160° C. for 90 min | |
| Average Initials strength (MPa) | 15.2 |
| Average Post strength (MPa): IPA:Water for 72 hours at RT | 15.7 |
| Average Post strength (MPa): Ethanol:Water for 72 hours at RT | 16.1 |
| Average Post strength (MPa): Oleic Acid for 72 hours at RT | 17.7 |
| Average Post strength (MPa): IPA:Water for 90 hours at 65° C. | 0.0 |
| Average Post strength (MPa): Ethanol:Water for 90 hours at 65° C. | 0.0 |
| Average Post strength (MPa): Oleic Acid for 90 hours at 65° C. | 19.8 |
| Mechanical properties | |
| Curing process: LED 20s + | |

TABLE 2-continued

| Component (wt. %) | CE2 |
| --- | --- |
| 160° C. for 90 min | |
| Average Tensile Strength (Mpa) | 17.1 (break strength) |
| Average Elongation (%) | 94.4 |
| Average Young's Modulus (Mpa) | 745.8 |

The cured product of the adhesive composition CE2 containing methacrylated polyether resin (methacrylated polytetrahydrofuran resin) instead of the methacrylated polybutadiene resin, exhibited extremely low chemical resistance at elevated temperature and relatively low tensile strength.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A radiation curable (meth)acrylic adhesive composition comprising:

i) a (meth)acrylated polydiene resin having two (meth) acryloyloxy groups grafted on the polydiene backbone via urethane groups; wherein the (meth)acrylated polydiene resin has a viscosity of less than 24,000 cP at 60° C. and wherein the (meth)acrylated polydiene resin is present in an amount of from 10 to 65% by weight based on the total weight of the adhesive composition;

ii) a multi-functional (meth)acrylic monomer component present in an amount of from 0.1 to 25% by weight based on the total weight of the adhesive composition;

iii) a mono-functional (meth)acrylic monomer component present in an amount of from 1 to 40% by weight based on the total weight of the adhesive composition; and iv) a photo initiator component.

2. The composition according to claim 1, wherein the (meth)acrylated polydiene resin is one or more resins selected from (meth)acrylated poly($C_4$-$C_8$)diene resins.

3. The composition according to claim 1, wherein the (meth)acrylated polydiene resin is selected from a (meth) acrylated polybutadiene resin, a (meth)acrylated polypentadiene resin, a (meth)acrylated polyisoprene resin, a (meth) acrylated polyhexadiene resin, a (meth)acrylated polyheptadiene resin, a (meth)acrylated polyoctadiene resin, and mixtures thereof.

4. The composition according to claim 1, wherein the adhesive composition does not contain (meth)acrylated polyether resin(s) and/or (meth)acrylated urethane resin(s).

5. The composition according to claim 1, wherein the multi-functional (meth)acrylic monomer is a di- to hexa-functional (meth)acrylic monomer.

6. The composition according to claim 1, wherein the multi-functional (meth)acrylic monomer is selected from di-functional (meth)acrylic monomers such as 1,3-butane-diol di(meth)acrylate, 1,4-butanediol di(meth)acrylate, 1,6-hexanediol di(meth)acrylate, 2-butyl-2-ethyl-1,3-propane-diol di(meth)-acrylate, 1,9-nonanediol di(meth)acrylate, ethylene glycol di(meth)acrylate, bisphenol A-ethylene glycol di(meth)acrylate, diethylene glycol di(meth)acrylate, triethylene glycol di(meth)-acrylate, tetraethylene glycol di(meth)acrylate, propylene glycol di(meth)acrylate, dipropylene glycol di(meth)acrylate, tripropylene glycol di(meth) acrylate, neopentyl glycol di(meth)acrylate, dicyclopentanyl di(meth)acrylate, caprolactone-modified dicyclopentenyl di(meth)acrylate, di(acryloxyethyl)isocyanurate, allylated cyclohexyl di(meth)acrylate, dimethylol dicyclopentane di(meth)acrylate, neopentylglycol-modified trimethylolpropane di(meth)acrylate, adamantine di(meth)acrylate, tricyclodecanedimethanol di(meth)acrylate; trimethylolpropane tri(meth)acrylate, pentaerythritol tri(meth)acrylate, dipentaerythritol tri(meth)acrylate, propylene oxide-modified trimethylolpropane tri(meth)acrylate, tris(acryloxy-ethyl) isocyanurate; pentaerythritol tetra(meth)acrylate, ditrimethylolpropane tetra(meth)acrylate, tetramethylolpropane tetra (meth)acrylate; dipentaerythritol penta(meth)acrylate; dipentaerythritol hexa(meth)acrylate, and mixtures thereof.

7. The composition according to claim 1, wherein the mono-functional (meth)acrylic monomer is selected from acrylic acid, n-butyl (meth)acrylate, 2-butyl (meth)acrylate, t-butyl (meth)acrylate, isobutyl (meth)acrylate, hexyl (meth) acrylate, 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, 2-methylbutyl (meth)acrylate, n-nonyl (meth)acrylate, isononyl (meth)acrylate, isoamyl (meth)acrylate, n-decyl (meth)acrylate, isodecyl (meth) acrylate, isobornyl (meth)acrylate, 4-methyl-2-pentyl (meth)acrylate, dodecyl (meth)acrylate, lauryl (meth)acrylate, 2-ethoxylethyl (meth)acrylate, 2-methoxyethyl (meth) acrylate, allyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 2-hydroxyethyleneglycol (meth)acrylate and 2-hydroxypropyleneglycol (meth)acrylate, and mixtures thereof.

8. The composition according to claim 1, wherein the photo-initiator component is contained in the adhesive composition in an amount of from 0.1 to 10% by weight based on the total weight of the adhesive composition.

9. The composition according to claim 1, further comprising an additive selected from the group consisting of an organosilane, an antioxidant, a corrosion-resistant agent, a leveling agent, a surface lubricant, a dye, a pigment, a defoaming agent, a filler, a photo-stabilizer, and combinations thereof.

10. The composition according to claim 1, wherein the adhesive composition does not contain isocyano-containing compound(s).

11. An article comprising:

a first substrate, a second substrate, and a cured adhesive between the first substrate and the second substrate;

wherein the cured adhesive comprises or consists of a cured product derived from the adhesive composition according to claim 1, wherein at least one substrate comprises a light transparent part, or at least one substrate is light transparent.

12. The article according to claim 11, wherein the article includes a wearable electronic device, handheld electronic device, eye glasses, a phone, a tablet, a sound player, a remote control device, a mouse, a watch band, a pump for dispensing medicine, or a combination thereof.

13. A method of bonding two substrates together, the method including applying the adhesive composition according to claim 1 to at least one of the substrates and then laminating the two substrates together, and then applying radiation to the adhesive composition; wherein at least one substrate comprises a light transparent part, or at least one substrate is light transparent.

\* \* \* \* \*